United States Patent [19]

Aoyama

[11] Patent Number: 4,825,098

[45] Date of Patent: Apr. 25, 1989

[54] BIDIRECTIONAL SEMICONDUCTOR DEVICE HAVING ONLY ONE ONE-DIRECTIONAL DEVICE

[75] Inventor: Keizo Aoyama, Yamato, Japan

[73] Assignee: Fujitsu Limited, Kawasaki, Japan

[21] Appl. No.: 130,630

[22] Filed: Dec. 8, 1987

[30] Foreign Application Priority Data

Dec. 17, 1986 [JP] Japan ................... 61-298887
Dec. 17, 1986 [JP] Japan ................... 61-298895
Dec. 18, 1986 [JP] Japan ................... 61-300112

[51] Int. Cl.⁴ .............. H03K 3/01; H03K 3/356; H03K 17/693; H03K 19/092
[52] U.S. Cl. .................. 307/243; 307/465; 307/475; 340/825.02; 340/825.43; 365/231; 365/154; 377/64; 364/716

[58] Field of Search .............. 307/443, 465, 466, 467, 307/468, 469, 475, 542, 243, 246, 248, 571, 574, 575, 576, 585, 270, 279, 272.1, 296.1, 304; 365/205, 230, 231, 154, 78; 364/716; 377/64, 69, 74; 370/60; 340/825.02, 825.43

[56] References Cited

U.S. PATENT DOCUMENTS

| | | | |
|---|---|---|---|
| 4,481,623 | 11/1984 | Clark | 307/243 X |
| 4,621,201 | 11/1986 | Amdahl et al. | 307/243 X |
| 4,697,095 | 9/1987 | Fujii | 307/243 |
| 4,709,173 | 11/1987 | Nishimichi et al. | 307/243 |
| 4,774,422 | 9/1988 | Donaldson et al. | 307/243 X |

Primary Examiner—Stanley D. Miller
Assistant Examiner—David R. Bertelson
Attorney, Agent, or Firm—Staas & Halsey

[57] ABSTRACT

In a one-directional internal circuit such as a first-in first-out (FIFO), switchover switches are provided between the internal input/output ports and external ports thereof, and the switches are controlled by a mode signal, thereby enabling a bidirectional data transmission within one chip.

8 Claims, 11 Drawing Sheets

Fig. 16A RST 
Fig. 16B $\overline{W/R}$ (A) 
Fig. 16C $\overline{W/R}$ (B) 
Fig. 16D $\overline{Q_1}$ 
Fig. 16E $\phi$ 
(H)
Fig. 16F M Fig. 17A $\overline{RST}$ 
Fig. 17B $\overline{W/R}$ (A) 
Fig. 17C $\overline{W/R}$ (B) 
Fig. 17D $\overline{Q_1}$ 
Fig. 17E $\phi$ 
Fig. 17F M

BIDIRECTIONAL SEMICONDUCTOR DEVICE HAVING ONLY ONE ONE-DIRECTIONAL DEVICE

BACKGROUND OF THE INVENTION

(1) Field of the Invention

The present invention relates to a bidirectional semiconductor device which enables a one-directional circuit such as a first-in first-out (FIFO) memory to carry out bidirectional data transmission.

(2) Description of the Related Art

Generally, a two-port buffer (chip) such as a FIFO memory, a last-in first-out (LIFO) memory, and a shift register has an input port and an output port, thereby establishing a one-directional data transmission from the input port to the output port. In the prior art, terminals corresponding to these input ports and output ports are fixed, and if one-directional FIFO's having these fixed input/output pins are used for a bidirectional data transmission, at least two FIFO's are required. As a result, the number of chips on a printed board is increased to increase the area of the board occupied by mounting the chips thereon (hereafter, board occupied area), and in addition, the input/output (I/O) connections on the printed board become complex. Note that the complexity of the I/O connections also increases the mounting density of the printed board because of the area occupied thereby, and deteriorates the electrical characteristics of the device due to the stray capacity of the connections.

SUMMARY OF THE INVENTION

Therefore, an object of the present invention is to provide a bidirectional semiconductor device by which the board occupied area on a printed circuit board is reduced and the I/O connections simplified.

According to the present invention, only one one-directional internal circuit, such as an FIFO memory, is provided. This one-directional internal circuit has an internal input port and an internal output port. The internal input port is connectable to either an A-side input/output terminal I/O (A) (external input/output port) or a B-side input/output terminal I/O (B) (external input/output port). The same holds true for the internal output port. The switching of such connections is carried out by a switching means, so that the internal input port is connected to one of the terminals I/O (A) and I/O (B), and the internal output port is connected to the other terminal. As a result, a switchover of bidirectional transmission between data transmission of the A-side input/output terminal I/O (A) →the internal circuit→the B-side input/output terminal I/O (B) and data transmission of the B-side input/output terminal I/O (B)→the internal circuit→the A-side input/output terminal I/O (A) is carried out by the switching means.

BRIEF DESCRIPTION OF THE DRAWINGS

The present invention will be more clearly understood from the description as set forth below and in contrast with the prior art with reference to the accompanying drawings, wherein.

DESCRIPTION OF THE PREFERRED EMBODIMENTS

First, the prior art bidirectional semiconductor device will be explained with reference to FIGS. 1 and 2.

Figure 1:
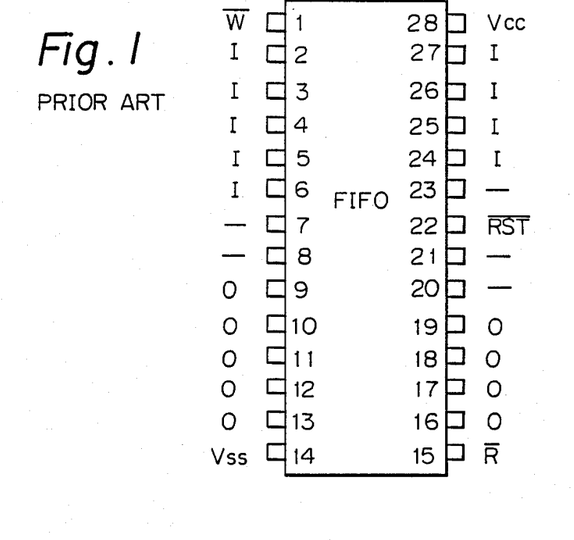
FIG. 1 is a schematic view showing a prior art one-directional device.

In FIG. 1, which illustrates a prior art one-directional device, i.e., a FIFO memory, a write control signal $\overline{W}$ is fixed to a first pin, input data IN ($I_0$ to $I_8$) is fixed to second to sixth pins and 24-th to 27-th pins, a read control signal $\overline{R}$ is fixed to a 15-th pin, and output data OUT ($O_0$ to $O_8$) is fixed to 9-th to 13-th pins and 16-th to 19-th pins. Note that $V_{CC}$ and $V_{SS}$ designate power supplies, and other terminals are designated "Full", "Empty" and the like.

Figure 2:
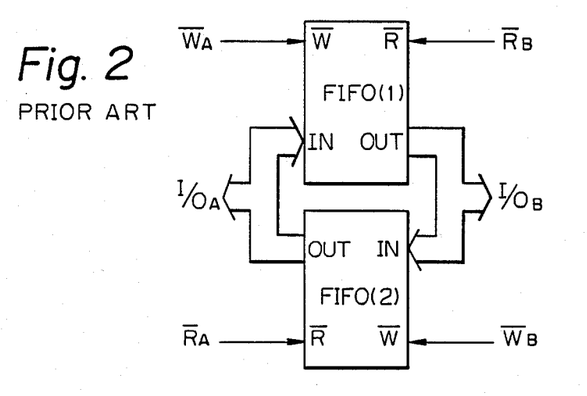
FIG. 2 is a block circuit diagram showing a prior art bidirectional device.

If one-directional FIFO's having the fixed input/output output pins are used for bidirectional data transmission, two FIFO's are connected as illustrated in FIG. 2. As a result, an FIFO (1) is used for data transmission from A-side to B-side, and an FIFO (2) is used for data transmission from B-side to A-side.

However, when a bidirectional device is constructed as illustrated in FIG. 2, the number of chips on a printed circuit board is increased to increase the board occupied area, and in addition, the input/output (I/O) connections on the printed board become complex. The complexity of the I/O connections also increases the mounting density of the printed board, because of the area occupied thereby, and deteriorates the electrical characteristics due to the stray capacity of the connections.

Figure 3:
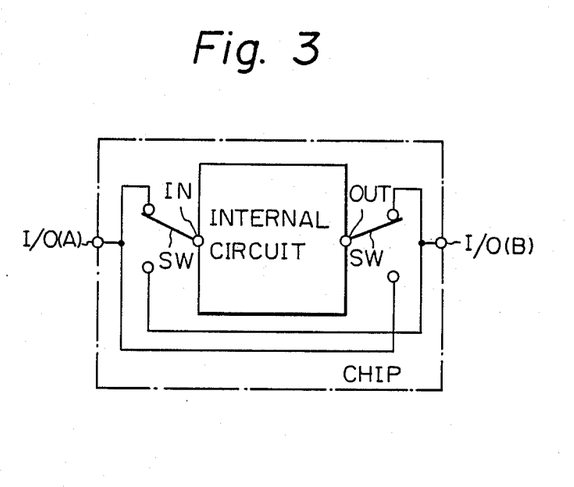
FIG. 3 is a circuit diagram illustrating a first embodiment of the bidirectional semiconductor device according to the present invention.

In FIG. 3, which illustrates a first embodiment of the present invention, a one-directional internal circuit has an internal input port IN and an internal output port OUT. The internal input port IN is connectable to either an A-side external input/output terminal I/O (A) or a B-side external input/output terminal I/O (B). The same holds true for the internal output port OUT. The switching of such connections is carried out by a switching means, so that the internal input port IN is connected to one of the external ports I/O (A) and I/O (B), and the internal output port OUT is connected to the other external port.

Figure 4:
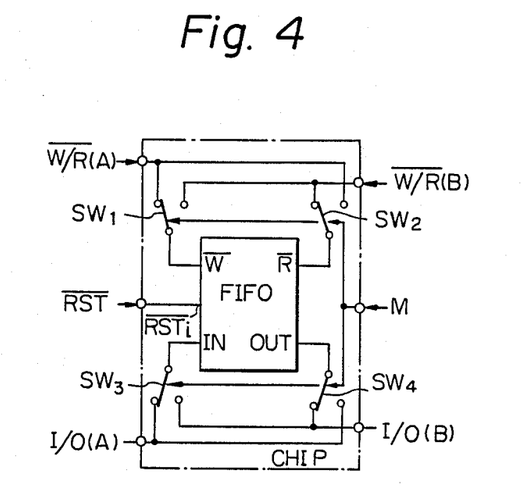
FIG. 4 is a detailed circuit diagram of the circuit of FIG. 3.

Also, referring to FIG. 4, which is a detailed circuit diagram of FIG. 3, a frame indicated by a dotted-solid line designates one chip. In this chip, only one FIFO memory is provided as the one-directional internal circuit. At the FIFO memory, internal ports such as a write control port $\overline{W}$, a read control port $\overline{R}$, an input port IN, an output port OUT, and a reset port $\overline{RST}_i$ are provided. Also provided in the periphery of the chip, are A-side external ports such as a write/read control port $\overline{W/R}$ (A) and an input/output port I/O (A), and B-side external ports such as a write/read control port $\overline{W/R}$ (B), an input/output port I/O (B), and a reset port $\overline{RST}$ for the connections to the exterior. The external reset port $\overline{RST}$ is fixed to the internal reset port $\overline{RST}_i$. Further, a first switch SW$_1$ is provided between the external ports $\overline{W/R}$ (A), W/R (B) and the internal port $\overline{W}$; a second switch SW$_2$ is provided between the external ports $\overline{W/R}$ (A), W/R (B) and the internal port $\overline{R}$; a third switch SW$_3$ is provided between the external ports I/O (A), I/O (B) and the internal port IN; and a fourth switch SW$_4$ is provided between the external ports I/O (A), I/O (B) and the internal port OUT. These switches SW$_1$ to SW$_4$ are operated simultaneously by a mode signal M supplied from the exterior of the chip.

Note that the internal ports IN and OUT, and the external ports I/O (A) and I/O (B) of FIG. 4, actually have a multi-bit configuration such as a 9-bit configuration as illustrated in FIG. 1, but, for simplification, such ports have a single-bit configuration in FIG. 4.

Each of the switches SW$_1$ to SW$_4$ of FIG. 4 will be explained with reference to FIGS. 5A to 5D.

Figure 5A:
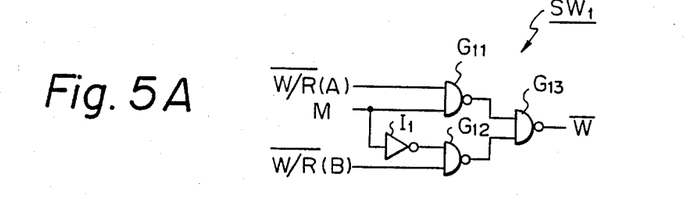
FIGS. 5A through 5D are logic circuit diagrams of the switches of FIG. 4.

As illustrated in FIG. 5A, the switch SW$_1$ is comprised of NAND circuits G$_{11}$, G$_{12}$, and G$_{13}$, and an inverter I$_1$. Therefore, when the mode signal M is "1", the signal at the external control port $\overline{W/R}$ (A) is supplied to the write control port $\overline{W}$ of the FIFO memory, and when the mode signal M is "0", the signal at the external control port $\overline{W/R}$ (B) is supplied to the write control port $\overline{W}$ of the FIFO memory.

Figure 5B:
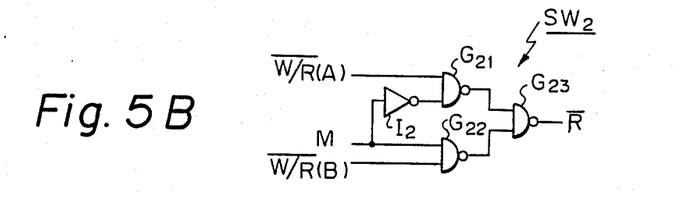

Similarly, as illustrated in FIG. 5B, the switch SW$_2$ is comprised of NAND circuits G$_{21}$, G$_{22}$, and G$_{23}$, and an inverter I$_2$. Therefore, when the mode signal M is "1", the signal at the external control port $\overline{W/R}$ (B) is supplied to the write control port $\overline{W}$ of the FIFO memory, and when the mode signal M is "0", the signal at the external control port $\overline{W/R}$ (A) is supplied to the write control port $\overline{W}$ of the FIFO memory.

Figure 5C:
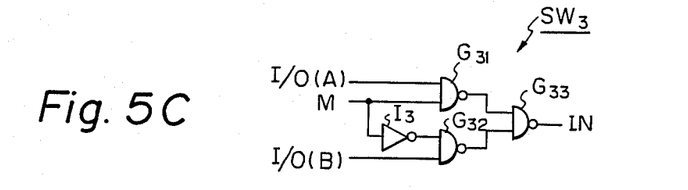

Also, as illustrated in FIG. 5C, the switch SW$_3$ is comprised of NAND circuits G$_{31}$, G$_{32}$, and G$_{33}$, and an inverter I$_3$. Therefore, when the mode signal M is "1", the signal at the external port I/O (A) is supplied to the input data port IN of the FIFO memory, and when the mode signal M is "0", the signal at the external port I/O (B) is supplied to the input data port IN of the FIFO memory.

Figure 5D:
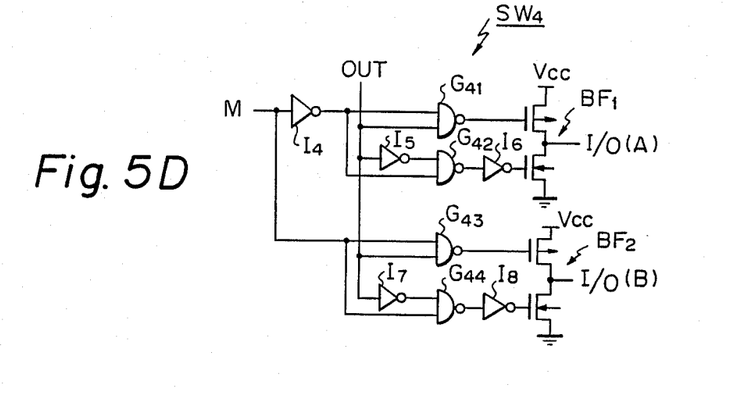

Further, as illustrated in FIG. 5D, the switch SW$_4$ is comprised of NAND circuits G$_{41}$, G$_{42}$, G$_{43}$, and G$_{44}$, inverters I$_4$ to I$_8$ and CMOS buffers BF$_1$ and BF$_2$. Therefore, when the mode signal M is "1", the lower-side circuit of FIG. 5D is operated so that data at the output data port OUT is transmitted to the B-side port I/O (B), and when the mode signal M is "0", the upper-side circuit of FIG. 5D is operated so that data at the output data port OUT is transmitted to the A-side port I/O (A).

Thus, in summary, the following table is obtained.

|  | M = "1" | M = "0" |
|---|---|---|
| $\overline{W}$ | $\overline{W/R}$ (A) | $\overline{W/R}$ (B) |
| $\overline{R}$ | $\overline{W/R}$ (B) | $\overline{W/R}$ (A) |
| IN | I/O (A) | I/O (B) |
| OUT | I/O (B) | I/O (A) |

Figure 6:
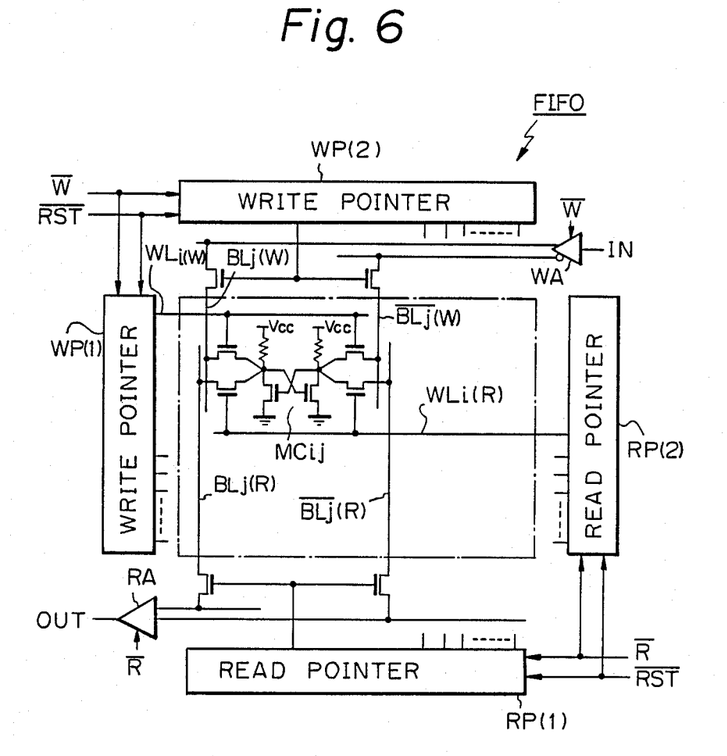
FIG. 6 is a detailed circuit diagram of the FIFO of FIG. 4.
Figure 7A:
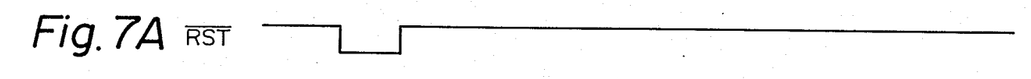
FIGS. 7A through 7G are timing diagrams explaining the operation of the circuit of FIG. 6.
Figure 7B:
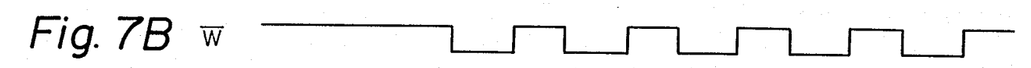
Figure 7C:
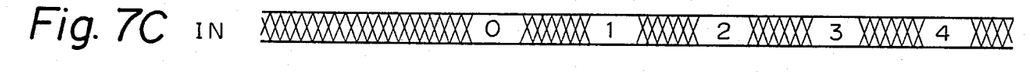
Figure 7D:
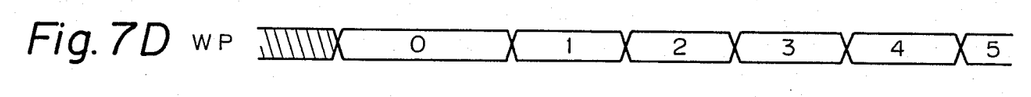
Figure 7E:
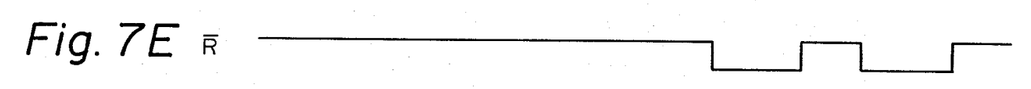
Figure 7F:
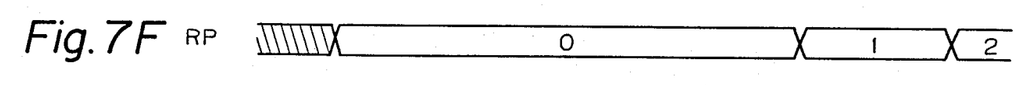
Figure 7G:
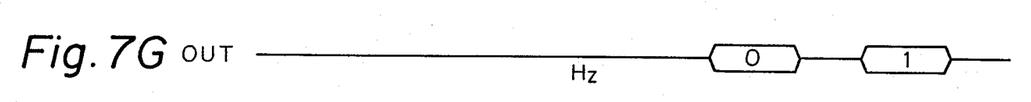

In FIG. 6, which is a detailed circuit diagram of the FIFO memory of FIG. 4, a static memory cell MC$_{ij}$ is provided between a write word line WL$_i$ (W), and a read word line WL$_i$ (R), and in write bit lines BL$_j$ (W), $\overline{BL}_j$ (W) and read bit lines BL$_j$ (R), $\overline{BL}_j$ (R). In a write mode ($\overline{W}$ = "0"), write data IN is written by a write amplifier WA into the memory cell MC$_{ij}$ between a word line such as WL$_i$ (W) selected by a write pointer WP (1) and write bit lines such as BL$_j$ (W), $\overline{BL}_j$ (W) selected by a write pointer WP (2). On the other hand, in a read mode ($\overline{R}$ = "0"), data of a memory cell between a read word line such as WL$_i$ (R) selected by a read pointer RP (1) and read bit lines such as BL$_j$ (R), $\overline{BL}_j$ (R) selected by a read pointer RP (2) is read and is transmitted as output data OUT via a read amplifier RA.

In a write operation of the FIFO memory, as illustrated in FIGS. 7A to 7D, the write pointers WP (1) and WP (2) are counted up one by one in accordance with a write control signal $\overline{W}$, thereby sequentially accessing the memory cells and writing data thereinto. Note that, in this case, the two write pointers serve as one write pointer WP and are reset by a reset signal $\overline{RST}$. That is, every time one of the write pointers WP (1) and WP (2) is cycled, the other pointer is counted up by +1.

On the other hand, in a read operation of the FIFO memory, as illustrated in FIGS. 7A, and 7E to 7G, the read pointers RP (1) and RP (2) are counted up one by one in accordance with a read control signal $\overline{R}$, thereby sequentially accessing the memory cells and reading data therefrom. Note that, also in this case, the two read pointers serve as one read pointer RP and are reset by a rest signal $\overline{RST}$. That is, every time one of the read pointers RP (1) and RP (2) is cycled, the other pointer is counted up by +1.

Figure 8:
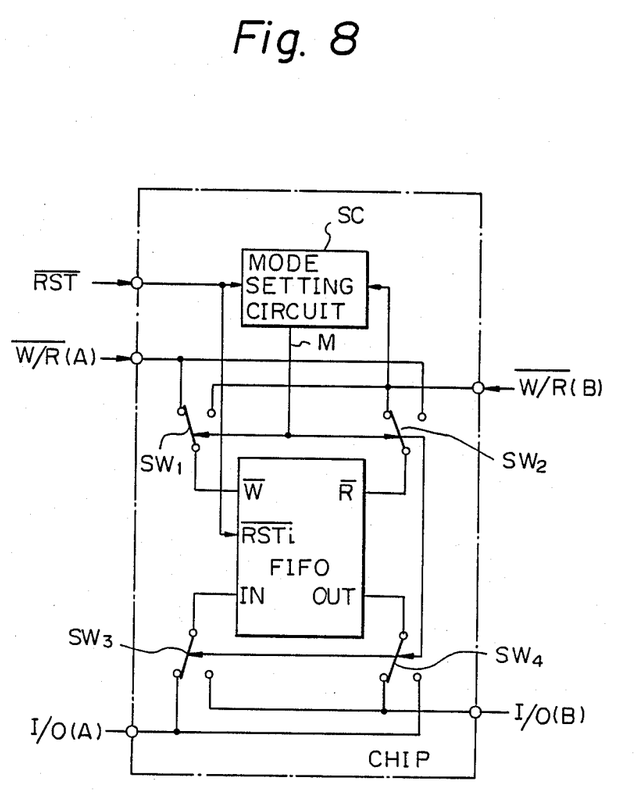
FIG. 8 is a circuit diagram illustrating a second embodiment of the bidirectional semiconductor memory device according to the present invention.

In FIG. 8, which illustrates a second embodiment of the present invention, a mode setting circuit SC for generating the mode signal M is added to the elements of the first embodiment of FIG. 4. The mode setting circuit SC detects the presence or absence of an overlap at a predetermined level such as "0" level of the signals of at least two originally existing external ports such as $\overline{RST}$ and $\overline{W/R}$ (B) without additional special ports, thereby generating the mode signal M within the chip.

The mode setting circuit SC of FIG. 8 will be explained with reference to FIG. 9. The mode setting circuit SC is comprised of an overlap detector (NOR circuit) DET1 for detecting an overlap of a low level ("0") of the external reset signal $\overline{RST}$ and a low level of an external write/read control signal $\overline{R/W}$ (B), a fall detector DET2 comprised of a delay circuit DL, an inverter I$_1$, and a NOR circuit G$_2$, and an RS flip-flop FF serving as a memory. This RS flip-flop FF is constructed as shown in FIG. 10. In the RS flip-flop FF, a power supply V$_{CC}$ is applied to a set terminal S, a ground potential is applied to a reset terminal R, the output of the overlap detector DET1 is applied to a clock terminal CK, and the output of the fall detector DET2 is applied to a clear terminal CL.

Therefore, as illustrated in FIGS. 11A through 11E, after the FIFO memory is reset by the signal $\overline{RST}$ and the flip-flop FF is reset by the output of the fall detector DET2 ($\overline{RST}$="0038"), even when the signal of the external control port $\overline{W/R}$ (B) is changed after the sufficient recovery of the reset signal $\overline{RST}$, the output of the overlap detector DET1 remains at "0". As a result, the flip-flop FF remains in a reset state, and therefore, the mode signal M remains at "1". On the other hand, as illustrated in FIGS. 12A through 12E, after the FIFO memory is reset by the reset signal RST and the flip-flop FF is reset by the output of the fall detector DET2 ($\overline{RST}$="0"), when the signal of the external control port $\overline{W/R}$ (B) is changed before the recovery of the reset signal $\overline{RST}$, the overlap detector DET1 detects an overlap of a low level between $\overline{RST}$ and $\overline{W/R}$ (B) to change the output thereof from "0" to "1". As a result, the flip-flop FF is set so that the mode signal M becomes "0". Thus, a desired mode signal M is generated within the chip by the inputs of the originally existing external ports without adding special external ports.

Figure 9:
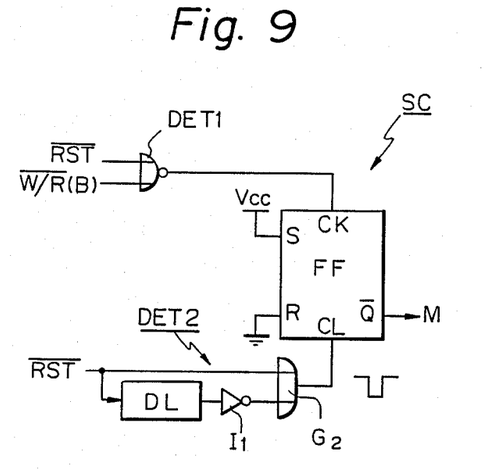
FIG. 9 is a circuit diagram of the mode setting circuit of FIG. 8.
Figure 10:
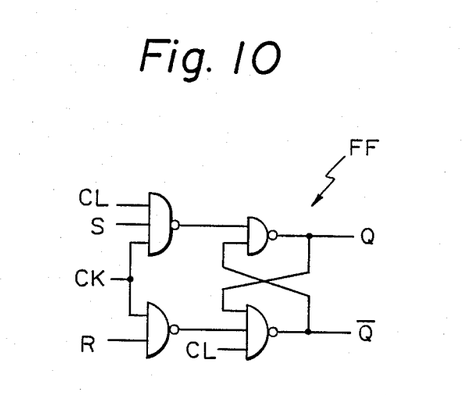
FIG. 10 is a circuit diagram of the flip-flop of FIG. 9.
Figure 11A:
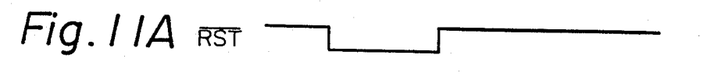
FIGS. 11A through 11E and FIGS. 12A through 12E are timing diagrams explaining the operation of the circuit of FIG. 9.
Figure 11B:
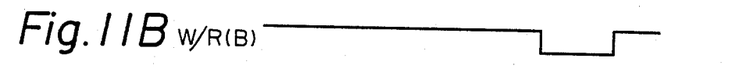
Figures 11C, 11D:
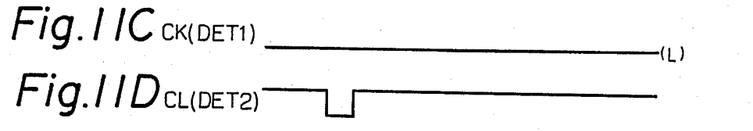
Figure 11E:
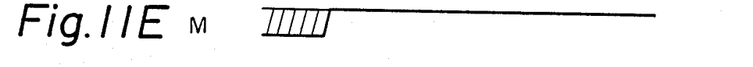
Figure 12A:
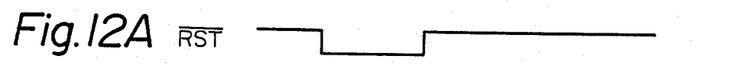
Figure 12B:
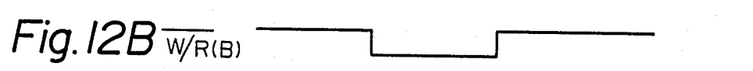
Figure 12C:
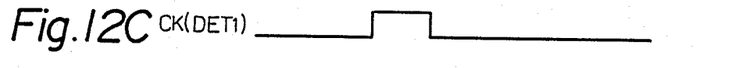
Figure 12D:
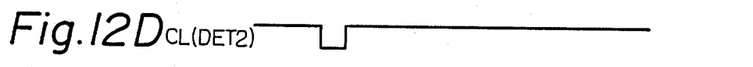
Figure 12E:
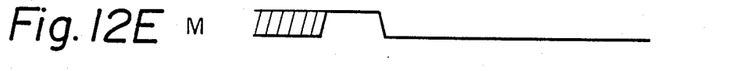

Note that, in FIG. 9, the flip-flop FF is reset (cleared) by the reset signal $\overline{RST}$, but such a reset operation can be carried out by applying the power supply if the circuit constants of the flip-flop FF are suitably set. Also, as occasion demands, the detector DET1 may detect an overlap of a high level between the two external ports, and a rise detector may be used instead of the fall detector DET2. Further, the mode signal M is set by an overlap of the signals of the two external input signals $\overline{RST}$, $\overline{W/R}$ (B), but other external input signals can be used.

Figure 13:
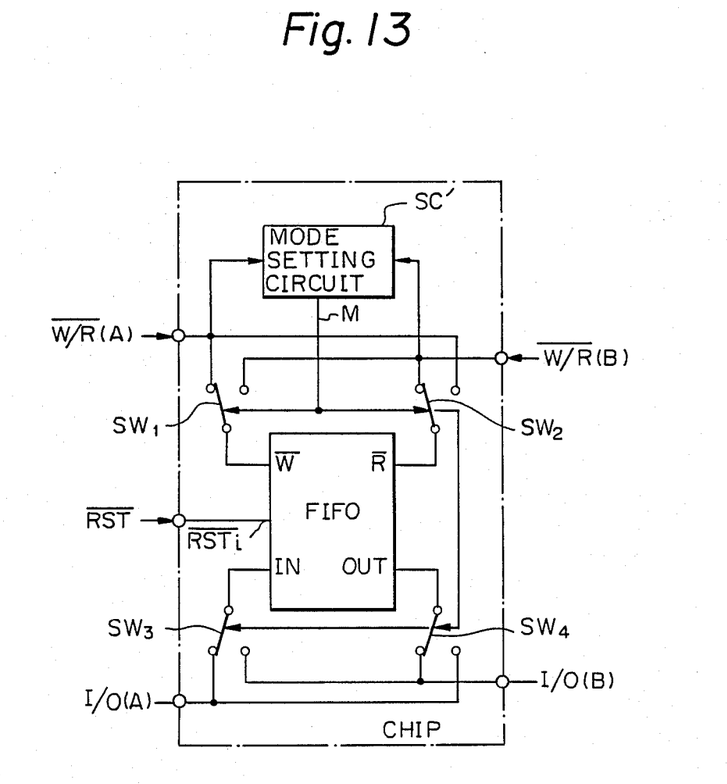
FIG. 13 is a circuit diagram illustrating a third embodiment of the bidirectional semiconductor memory device according to the present invention.

In FIG. 13, which illustrates a third embodiment of the present invention, a mode setting circuit SC' for generating the mode signal M is added to the elements of the first embodiment of FIG. 4. The mode setting circuit SC' detects the sequence of the signals of at least two originally existing external ports such as W/R (A) and W/R (B) without additional special ports, thereby generating the mode signal M within the chip.

The mode setting circuit SC' of FIG. 13 will be explained with reference to FIG. 14. The mode setting circuit SC' is comprised of two RS flip-flops FF1 and FF2 each of which is constructed as shown in FIG. 15. In the RS flip-flop FF1, a power supply $V_{CC}$ is applied to a set terminal S, a ground potential is applied to a reset terminal R, the reset signal RST is applied to a clear terminal CL, and the signal at the A-side external input/output control port $\overline{W/R}$ (A) is applied to a clock terminal CK. In addition, the output $\overline{Q}(=\overline{Q}_l)$ of the flip-flop FF1 is supplied with the signal of the B-side external input/output control port $\overline{W/R}$ (B) to a NAND circuit $G_1$ which generates a signal $\phi$. Further, in the flip-flop FF2, a power supply $V_{CC}$ is applied to a set terminal S, a ground potential is applied to a reset terminal R, a reset signal $\overline{RST}$ is applied to a clear terminal CL, and the signal $\phi$ is applied to a clock terminal CK. Then, the output $\overline{Q}$ of the flip-flop FF2 serves as the mode signal M.

Therefore, as illustrated in FIGS. 16A through 16F, after the FIFO memory is reset by the reset signal $\overline{RST}$ ($\overline{RST}$="0"), when the pulse of the A-side input/output control port $\overline{W/R}$ (A) precedes the pulse of the B-side input/output control port $\overline{W/R}$ (B), the mode signal M remains at "1". On the other hand, as illustrated in FIGS. 17A through 17F, after the FIFO memory is reset by the reset signal $\overline{RST}$ ($\overline{RST}$="0"), when the pulse of the B-side input/output control port $\overline{W/R}$ (B) precedes the pulse of the A-side input/output control port $\overline{W/R}$ (A), the mode signal M becomes a low level ("0"). Thus, a desired mode signal M is generated within the chip by the inputs of the originally existing external ports without adding special external ports.

Figure 14:
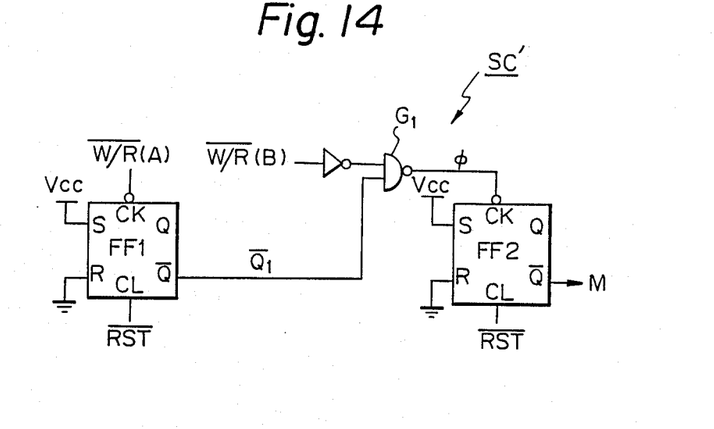
FIG. 14 is a circuit diagram of the mode setting circuit of FIG. 13.
Figure 15:
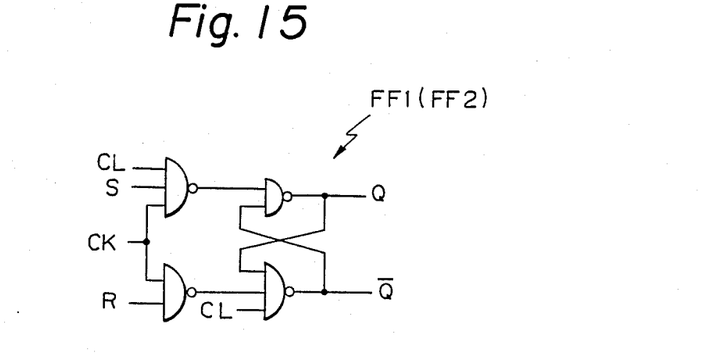
FIG. 15 is a circuit diagram of the flip-flop of FIG. 14.
Figure 16A:
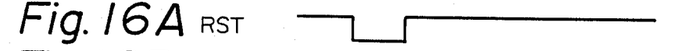
FIGS. 16A through 16F and FIGS. 17A through 17F are timing diagrams explaining the operation of the circuit of FIG. 14.
Figures 16B, 16C, 16D, 16E:
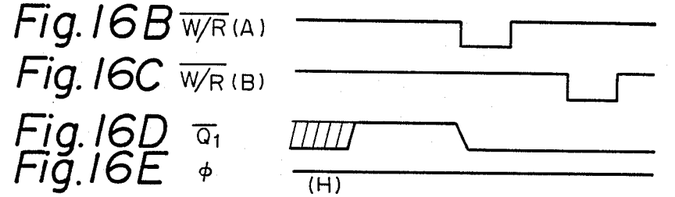
Figure 16F:
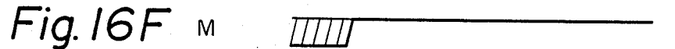
Figure 17A:
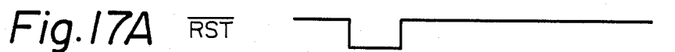
Figures 17B, 17C, 17D:
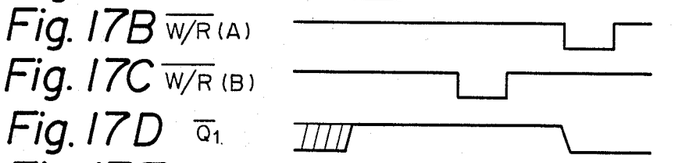
Figure 17E:
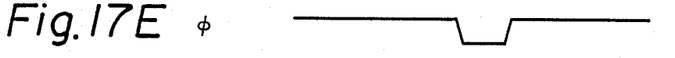
Figure 17F:
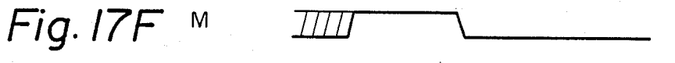

Note that, in FIG. 14, the flip-flops FF1 and FF2 are reset (cleared) by the reset signal $\overline{RST}$, but such a reset operation can be carried out by applying the power supply if the circuit constants of the flip-flops FF1 and FF2 are suitably set. Also, in this case, the mode signal M is determined by which of the A-side input/output output control port $\overline{W/R}$ (A) and the B-side input/output control port $\overline{W/R}$ (B) receives a preceding pulse. Further, in the circuit of FIG. 14, it is particularly useful in the FIFO memory to determine which of the ports $\overline{W/R}$ (A) and $\overline{W/R}$ (B) is a write-side to which a preceding pulse is applied. That is, in the FIFO memory, after resetting, there is no purpose to a read if there is no written data, and accordingly, a write instruction commonly precedes a read instruction.

Note that, in the above-mentioned embodiments, an FIFO memory is used as a one-directional circuit, however, the present invention can be applied to other circuits such as LIFO and a shift register.

As explained above, according to the present invention, since the bidirectional semiconductor device is constructed by only one one-directional circuit, the board occupied area on a printed circuit board can be reduced, and in addition, the connections thereof can be simplified.

I claim:
1. A bidirectional semiconductor device comprising:
   only one one-directional internal circuit having an internal input port and an internal output
   first and second external input/output ports; and
   switching means for connecting said internal input port to one of said first and second external input-/output ports and connecting said internal output port to said other port in accordance with a mode signal.
2. A device as set forth in claim 1, wherein said one directional internal circuit further has a plurality of internal control ports,
   said device further comprising:
   a plurality of external control ports, connectable to said internal control ports; and
   means, connected to said external control ports, for generating said mode signal for controlling said switching means, in accordance with the presence or absence of an overlap between at least two of said external control ports after the application of a power supply or after an initial set,
   said switching means further connecting said internal control ports to said external control ports in accordance with said mode signal.
3. A device as set forth in claim 2, wherein said mode signal generating means comprises:
   an overlap detector, connected to first and second ports of said external control ports, for detecting an overlap between the signals thereof;
   a change detector, connected to said first port of said external control ports, for detecting a fall or rise thereof;
   a flip-flop, connected to said overlap detector and to said change detector, said flip-flop being reset by the output of said change detector and set by the output of said overlap detector, thereby generating said mode signal.

4. A device as set forth in claim 1, wherein said one directional internal circuit further has a plurality of internal control ports, said device further comprising:
a plurality of external control ports, connectable to said internal control ports; and
means, connected to said external control ports, for generating said mode signal for controlling said switching means, in accordance with a sequence between at least two of said external control ports after an application of a power supply or after an initial set,
said switching means further connecting said internal control ports to said external control ports in accordance with said mode signal.

5. A device as set forth in claim 4, wherein said mode signal generating means comprises:
a first flip-flop, connected to first and second ports of said external control ports, for detecting a change at the signal of said second port after a signal at said first port is changed;
a gate, connected to a third port of said external control ports and to the output of said first flip-flop, for passing a signal at said third port therethrough in accordance with an output of said first flip-flop; and
a second flip-flop, connected to said first external control port and to an output of said gate, said second flip-flop being reset by a signal at said first port and set by an output of said gate, thereby generating said mode signal.

6. A device as set forth in claim 1, wherein said one-directional internal circuit comprises a first-in first-out memory (FIFO).

7. A device as set forth in claim 1, wherein said one-directional internal circuit comprises a last-in first-out memory (LIFO).

8. A device as set forth in claim 1, wherein said one-directional internal circuit comprises a shift register.

* * * * *

UNITED STATES PATENT AND TRADEMARK OFFICE
CERTIFICATE OF CORRECTION

PATENT NO. : 4,825,098
DATED : APRIL 25, 1989
INVENTOR(S) : KEIZO AOYAMA

It is certified that error appears in the above-identified patent and that said Letters Patent is hereby corrected as shown below:

Col. 2, line 46, delete "output".

Col. 3, line 21, "$\overline{W}/R$" should be --$\overline{W/R}$--.

Col. 5, line 6, "($\overline{RST}$ = "0038")" should be --($\overline{RST}$ = "0")--.

Col. 6, line 36, after "output" insert --port;--.

Signed and Sealed this

Fourteenth Day of November, 1989

*Attest:*

JEFFREY M. SAMUELS

*Attesting Officer*   *Acting Commissioner of Patents and Trademarks*